United States Patent
Morimoto

(10) Patent No.: US 9,315,191 B2
(45) Date of Patent: Apr. 19, 2016

(54) DRIVING ASSISTANCE DEVICE

(75) Inventor: Kazuhiro Morimoto, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 16 days.

(21) Appl. No.: 14/390,861

(22) PCT Filed: Apr. 12, 2012

(86) PCT No.: PCT/JP2012/060081
§ 371 (c)(1),
(2), (4) Date: Oct. 6, 2014

(87) PCT Pub. No.: WO2013/153660
PCT Pub. Date: Oct. 17, 2013

(65) Prior Publication Data
US 2015/0057834 A1      Feb. 26, 2015

(51) Int. Cl.
  B60W 30/00    (2006.01)
  G08G 1/16     (2006.01)
  B62D 15/02    (2006.01)
  G08G 1/0967   (2006.01)
  B60W 50/06    (2006.01)

(52) U.S. Cl.
  CPC ............. *B60W 30/00* (2013.01); *B62D 15/029* (2013.01); *G08G 1/096716* (2013.01); *G08G 1/096758* (2013.01); *G08G 1/096783* (2013.01); *G08G 1/163* (2013.01); *G08G 1/165* (2013.01); *B60W 2050/065* (2013.01)

(58) Field of Classification Search
  CPC ........... B62D 15/029; G08G 1/096716; G08G 1/096783; G08G 1/163; G08G 1/096758; G08G 1/165; B60W 30/00; B60W 2050/065
  See application file for complete search history.

(56) References Cited

U.S. PATENT DOCUMENTS

| | | | | |
|---|---|---|---|---|
| 6,631,324 B2* | 10/2003 | Okamura | ................ | G01S 7/412 701/301 |
| 6,862,527 B2* | 3/2005 | Okamura | ................ | G01S 7/412 340/435 |
| 7,739,022 B2* | 6/2010 | Kobayashi | ................ | B60T 7/22 180/282 |
| 7,930,096 B2* | 4/2011 | Kubota | .................. | B60Q 9/008 340/575 |
| 8,140,266 B2* | 3/2012 | Nakamura | .......... | B60W 40/072 701/495 |

(Continued)

FOREIGN PATENT DOCUMENTS

| | | |
|---|---|---|
| JP | 2004-178194 | 6/2004 |
| JP | 2004-246631 | 9/2004 |

(Continued)

OTHER PUBLICATIONS

International Search Report issued May 22, 2012, in PCT/JP2012/060081, filed Apr. 12, 2012.

*Primary Examiner* — Russell Frejd
(74) *Attorney, Agent, or Firm* — Oblon, McClelland, Maier & Neustadt, L.L.P

(57) ABSTRACT

The present invention is a driving assistance device which provides driving assistance based on detection information of an obstacle in which an information processing amount of the driving assistance for the obstacle is changed according to a level of the driving assistance. The present invention also is the driving assistance device which provides the driving assistance to output information which can be recognized to a driver based on the detection information of the obstacle in which an information amount of the driving assistance to be presented to the driver is increased according to an increase in the level of the driving assistance.

20 Claims, 5 Drawing Sheets

(56) References Cited

U.S. PATENT DOCUMENTS

| | | | |
|---|---|---|---|
| 2005/0137756 A1* | 6/2005 | Takahashi | G08G 1/161 701/1 |
| 2007/0145818 A1* | 6/2007 | Kobayashi | B60T 7/22 303/113.4 |
| 2010/0168998 A1* | 7/2010 | Matsunaga | B60W 30/10 701/532 |
| 2014/0148971 A1* | 5/2014 | Sobue | B62D 15/0275 701/1 |

FOREIGN PATENT DOCUMENTS

| | | |
|---|---|---|
| JP | 2005-196644 | 7/2005 |
| JP | 2007-86880 | 4/2007 |
| JP | 2012-212271 | 11/2012 |

\* cited by examiner

DRIVING ASSISTANCE DEVICE

FIELD

The present invention relates to a driving assistance device.

BACKGROUND

Conventionally, in a traffic environment of a vehicle, a driving assistance device which assists a driver in driving operation of the vehicle is reported. For example, such driving assistance is conducted by notifying the driver of information about presence of a vehicle getting across a travel direction of an own vehicle.

Herein, the driving assistance when such vehicle turns right and the like at an intersection is desired to be sequentially and appropriately provided for the vehicle getting across a course of the own vehicle. Further, technology for providing the appropriate driving assistance according to a sequentially approaching oncoming vehicle is conventionally reported. For example, Patent Literature 1 discloses a right turn assistance information presenting device which displays a required distance to the oncoming vehicle estimated from time required for the right turn to be completed and a position of the oncoming vehicle before the right turn is started to the driver of the own vehicle when the own vehicle turns right at the intersection.

In addition, Patent Literature 2 discloses a method of presenting travel assistance information which does not carry out operation for avoiding collision when there is a predetermined number of or more approaching vehicles which travel on a lane intersecting with a travel lane of the own vehicle as conventional technology to carry out the driving assistance. Patent Literature 3 discloses a vehicular information providing device which, when there is a plurality of vehicles on an oncoming lane, calculates over taking possibility in a plurality of oncoming vehicles from a vehicle speed and a distance to the intersection.

CITATION LIST

Patent Literature

Patent Literature 1: Japanese Patent Application Laid-open No. 2005-196644 A
Patent Literature 2: Japanese Patent Application Laid-open No. 2004-246631 A
Patent Literature 3: Japanese Patent Application Laid-open No. 2004-178194 A

SUMMARY

Technical Problem

However, in the conventional technology (Patent Literatures 1 to 3 and the like), an information processing load increases when the number of oncoming vehicles being processing targets increases in the driving assistance, so that they have a room for improvement in this point.

The present invention is achieved in view of the above-described circumstances and an object thereof is to provide the driving assistance device capable of suppressing the information processing load in the driving assistance.

Solution to Problem

The present invention is a driving assistance device configured to provide driving assistance based on detection information of an obstacle. The driving assistance device changes an information processing amount of the driving assistance for the obstacle according to a level of the driving assistance.

In the driving assistance device, it is preferable that the driving assistance device decreases the information processing amount of the driving assistance according to a decrease in the level of the driving assistance.

In the driving assistance device, it is preferable that the information processing includes a process to estimate the detection information of the obstacle which cannot be obtained, and the driving assistance device determines whether to perform the process to estimate according to the level of the driving assistance.

In the driving assistance device, it is preferable that the driving assistance device decreases the information processing amount of the driving assistance by not performing dead reckoning to at least estimate a position of the obstacle which cannot be obtained at the time the level of the driving assistance is lower than a threshold and by performing the dead reckoning at the time the level of the driving assistance is equal to or more than the threshold.

In the driving assistance device, it is preferable that at the time the level of the driving assistance is equal to or more than the threshold and at the time the detection information cannot be obtained, the driving assistance device decreases the information processing amount of the driving assistance by not performing the dead reckoning at the time possibility of collision with the obstacle is low and by performing the dead reckoning at the time the possibility of collision with the obstacle is high.

In the driving assistance device, it is preferable that at the time the level of the driving assistance is equal to or more than the threshold and at the time the detection information cannot be obtained, the driving assistance device determines whether the detection information corresponding to the detection information which cannot be obtained is included in infrastructure information received from an infrastructure device capable of communicating, and at the time the corresponding detection information is included in the infrastructure information, the driving assistance device decreases the information processing amount of the driving assistance by not performing the dead reckoning.

In the driving assistance device, it is preferable that the driving assistance device includes a level determining unit mounted on a vehicle. The level of the driving assistance is the level determined by the level determining unit.

In the driving assistance device, it is preferable that the level of the driving assistance is a warning level about the obstacle.

In the driving assistance device, it is preferable that the warning level about the obstacle includes information provision, a reminder with the warning level higher than the warning level of the information provision, and an alarm with the warning level higher than the warning level of the reminder.

In the driving assistance device, it is preferable that the level of the driving assistance is a warning level about the obstacle. The warning level about the obstacle includes information provision, a reminder with the warning level higher than the warning level of the information provision, and an alarm with the warning level higher than the warning level of the reminder. The driving assistance device does not perform the dead reckoning at the time the warning level about the obstacle is the information provision, and perform the dead reckoning at the time the warning level about the obstacle is the reminder or the alarm.

In the driving assistance device, it is preferable that the information processing amount of the driving assistance is an amount of processing the detection information of the obstacle.

Further, the present invention is a driving assistance device configured to provide driving assistance to output information which is recognizable to a driver based on detection information of an obstacle. The driving assistance device increases an information amount of the driving assistance which is recognizable to the driver according to an increase in a level of the driving assistance.

Advantageous Effects of Invention

The driving assistance device according to the present invention has an effect of suppressing the information processing load in the driving assistance.

DESCRIPTION OF EMBODIMENTS

Embodiments of a driving assistance device and a driving assistance method according to the embodiments of the present invention are hereinafter described in detail with reference to the drawings. Meanwhile, the present invention is not limited by the embodiments. Further, components in the following embodiments include a component easily conceived of by one skilled in the art or a substantially identical component.

[Embodiment]

Figure 1:
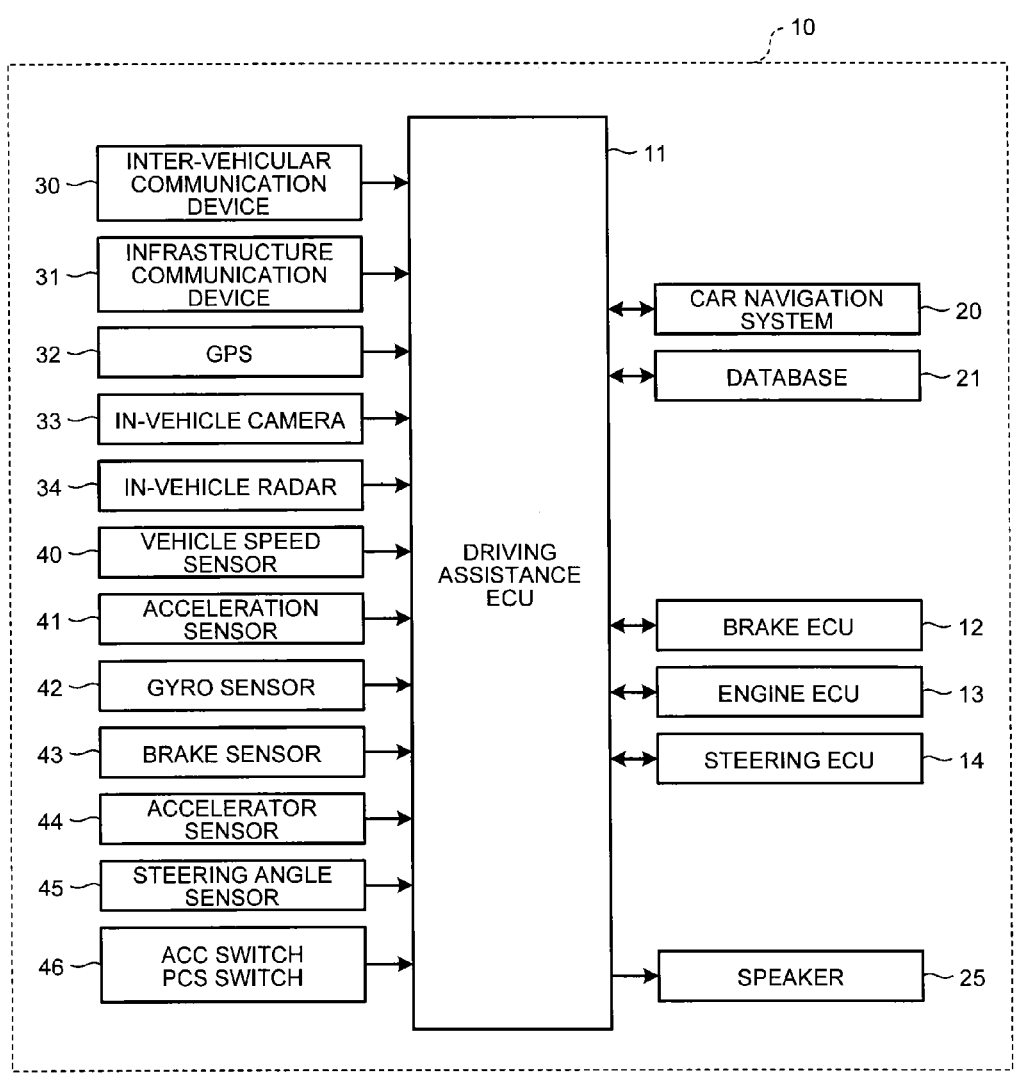
FIG. 1 is a block diagram of an example of a configuration of a driving assistance system according to the present embodiment.

A configuration of a driving assistance system according to an embodiment of the present invention is described with reference to FIG. 1. FIG. 1 is a block diagram of an example of the configuration of the driving assistance system according to the embodiment.

In FIG. 1, reference sign 10 represents a vehicle, reference sign 11 represents a driving assistance ECU, reference sign 12 represents a brake ECU, reference sign 13 represents an engine ECU, and reference sign 14 represents a steering ECU. Reference sign 20 represents a car navigation system, reference sign 21 represents a database, and reference sign 25 represents a speaker. Reference sign 30 represents an inter-vehicular communication device, reference sign 31 represents an infrastructure communication device, reference sign 32 represents a GPS, reference sign 33 represents an in-vehicle camera, and reference sign 34 represents in-vehicle radar. Reference sign 40 represents a vehicle speed sensor, reference sign 41 represents an acceleration sensor, reference sign 42 represents a gyro sensor, reference sign 43 represents a brake sensor, reference sign 44 represents an accelerator sensor, reference sign 45 represents a steering angle sensor, and reference sign 46 represents ACC switch/a PCS switch.

As illustrated in FIG. 1, the vehicle 10 is provided with the driving assistance ECU 11 as a driving assistance device which carries out various types of control and the like for assisting a driver who drives the vehicle 10 in driving operation. The driving assistance ECU 11 is formed around a microcomputer provided with a CPU which executes various types of arithmetic processing, a ROM which stores various control programs, a RAM used as a work area for storing data and executing the program, an input/output interface, a memory and the like. In the embodiment, the driving assistance ECU 11 executes the various types of control concerning driving assistance and determines timing with which the driving assistance should be provided based on various conditions to output information and signals about the driving assistance according to the timing. Therefore, various programs for providing the driving assistance and various parameters used for the assistance are stored in advance in the driving assistance ECU 11. The various parameters include values and the like indicating a property and performance of the vehicle 10 used in arithmetic of the timing and the like of the driving assistance.

A brake control computer (brake ECU) 12 which controls a brake of the vehicle 10 and an engine control computer (engine ECU) 13 which controls an engine of the vehicle 10 are connected to the driving assistance ECU 11 through an in-vehicle network such as a control area network (CAN) so as to be able to communicate therewith. Further, a steering control computer (steering ECU) 14 which controls steering of the vehicle 10 also is connected thereto through the in-vehicle network such as the CAN so as to be able to communicate therewith. Meanwhile, each of the above-described ECUs 12 to 14 is formed around a microcomputer provided with a CPU which executes various types of arithmetic processing, a ROM which stores various control programs, a RAM used as a work area for storing data and executing the program, an input/output interface, a memory and the like as in the case of the above-described driving assistance ECU 11.

The brake ECU 12 being the ECU which controls a brake device of the vehicle 10 to which various sensors such as the vehicle speed sensor 40 and the brake sensor 43 are connected generates braking force on the vehicle 10 through the control of the brake device of the vehicle 10 based on signals from the various sensors. Specifically, The brake ECU 12 calculates required braking force based on a speed of the vehicle 10 grasped based on the signal from the vehicle speed sensor 40, the signal of a brake step amount from the brake sensor 43 and the like to control the brake device.

The engine ECU 13 is the ECU which controls operation of the engine of the vehicle 10 to which the accelerator sensor 44 which detects an accelerator step amount, a sensor which detects an intake air volume and the like are connected, and driving circuits of various devices such as a driving circuit of a throttle valve and a driving circuit of a fuel injection valve are connected. The engine ECU 13 detects an operational state and the like of the engine grasped based on detection signals input from the above-described sensors and outputs command signals of the driving circuits of the above-described various devices. In this manner, the operational control of the engine is carried out through the engine ECU 13.

The steering ECU 14 being the ECU which controls the steering of the vehicle 10 connected to various sensors such as the gyro sensor 42 and the steering angle sensor 45 controls the steering by power-assisted control and the like based on signals from the various sensors.

The car navigation system 20 and the database 21 which holds various pieces of information so as to be readable and writable are connected to the driving assistance ECU 11 through the in-vehicle network such as the CAN so as to be able to communicate therewith.

The car navigation system 20 detects a current position of the vehicle by using the global positioning system (GPS) 32 and the like and guides the driver through a travel route and the like of the vehicle 10 to a destination with reference to road map information stored in advance. The car navigation system 20 is provided with a display device, an input device, and an audio device not illustrated.

The display device formed of a liquid crystal display, for example, is arranged in the vicinity of a center console in a vehicle interior. An image corresponding to image data and the like input from the car navigation system 20 is displayed on the display device. According to this, the car navigation system 20 outputs the image data obtained by combining the current position of the vehicle 10 and a map of a peripheral area, for example, and allows the display device to display the image obtained by combining the position of the vehicle 10 and the map of the peripheral area. The display device displays the image data of map display and the image data of notice display and the like according to the information of the driving assistance input from the driving assistance ECU 11 from the car navigation system 20.

In the embodiment, the display device displays the information of the driving assistance according to a level of the driving assistance. Herein, the level of the driving assistance is the level determined by the driving assistance ECU 11 and is a warning level about an obstacle located around the vehicle 10. The warning level about the obstacle includes information provision, a reminder with the warning level higher than that with the information provision, and an alarm with the warning level higher than that with the reminder. Specifically, the level of the driving assistance, that is to say, the warning level about the obstacle includes the first level to provide information of a detected obstacle (information provision), the second level to provide a reminder of the obstacle (reminder), and the third level to give an alarm about the obstacle (alarm), for example. In addition, the fourth level to carry out vehicle control such as the brake control, the engine control, and the steering control by the brake ECU 12, the engine ECU 13, the steering ECU 14 and the like (vehicle control) may be included as the level of the driving assistance. Meanwhile, the levels of the driving assistance may be changed. For example, the level of the driving assistance may be determined according to a state and a driving load of the driver by a level determining unit of the driving assistance ECU 11 or the level of the driving assistance is determined according to a result of operation of an input device such as a switch by the driver.

As an example, the driving assistance at the first level is the driving assistance to provide simple information such as to detect the presence of the obstacle around the vehicle 10 and notify the driver of the presence of the obstacle. The driving assistance at the second level is the driving assistance to calculate a speed of an oncoming vehicle and a distance thereto when there is the oncoming vehicle approaching an own vehicle and provide a reminder that the oncoming vehicle is approaching. The driving assistance at the third level is the driving assistance to calculate time to collision from the speed of the oncoming vehicle and the distance thereto when there is the oncoming vehicle approaching the own vehicle and give an alarm to indicate how many seconds it takes until the oncoming vehicle might collide and indicate how the vehicle 10 should be controlled so as to avoid the collision.

Herein, an information processing amount required for the driving assistance ECU 11 to process in order to provide the driving assistance increases in order from the first level to the third level and decreases in order from the third level to the first level. That is to say, the information processing amount of the driving assistance increases according to an increase in the level of the driving assistance and the information processing amount of the driving assistance decreases according to a decrease in the level of the driving assistance. This is because the information processing amount is larger in the driving assistance at the second or third level than that at the first level, since the speed of the oncoming vehicle and the distance thereto are calculated in the driving assistance at the second or third level while only the presence of the obstacle is required in the driving assistance at the first level. This is also because the information processing amount is larger in the driving assistance at the third level than that at the second level, since the time to the collision is calculated from the speed of the oncoming vehicle and the distance thereto in the driving assistance at the third level while only the speed of the oncoming vehicle and the distance thereto are calculated in the driving assistance at the second level.

In this manner, the information processing amount required in the driving assistance at the first level is smaller than that at the second level and the information processing amount required in the driving assistance at the second level is smaller than that at the third level in the embodiment. Therefore, an information processing load put on the driving assistance ECU 11 is smaller at the first level than at the second level and smaller at the second level than at the third level.

A touch switch or a mechanical switch integral with the display device and the like is used, for example as the input device to be used in various types of input operation.

The audio device is the device which emits a sound and a voice from which the sound and the voice corresponding to sound and voice data and the like input from the car navigation system 20 are output. Audio information such as route guidance and traffic information and the audio information corresponding to the driving assistance information according to each level of the driving assistance from the driving assistance ECU 11 are input from the car navigation system 20 to the audio device as the sound and voice data.

The car navigation system 20 of the embodiment obtains the road map information stored in advance in the database 21 to use. The car navigation system 20 transmits positional information about the position of the vehicle 10 and the road map information extracted as information around the current position to the driving assistance ECU 11.

The database 21 is a device which stores various pieces of information such as the road map information (map database) used in a navigation process, setting information about the level of the driving assistance, and detection information of the obstacle obtained in the past and a hard disk drive (HDD) being a non-volatile storage device is used as the storage device.

The road map information is the information about the map and is formed of data for displaying the road and a background of a road map, data formed of a name of an intersection and the like. The road map information includes road associated information such as information of a shape of the road, an intersection and a crosswalk on the road. Specifically, the road map information includes information of a position of a target intersection at which a traffic light is provided, the shape of the road, a tunnel, the crosswalk, a point at which accidents frequently occur, and a road surface state as the road associated information.

From this, the above-described road associated information and the like is also included in the road map information transmitted from the car navigation system 20 to the driving assistance ECU 11.

Further, an output device (man-machine interface) which outputs notice according to the various pieces of information based on the driving assistance such as the speaker 25 is electrically connected to the driving assistance ECU 11. The output device is the device which emits the voice, an alarm sound and the like for reminding the driver based on the notice concerning the driving assistance and outputs an audio guidance message, the alarm sound and the like according to the signal from the driving assistance ECU 11. Meanwhile, the output device is not limited to the above-described speaker.

Various information obtaining devices such as the inter-vehicular communication device 30, the infrastructure communication device 31, the global positioning system (GPS) 32, the in-vehicle camera 33, and the in-vehicle radar 34 are electrically connected to the driving assistance ECU 11.

The inter-vehicular communication device 30 is a communication device which performs so-called inter-vehicular communication in which various pieces of information such as the positional information and travel information of the vehicle 10 are transmitted to/from another vehicle located around the vehicle 10 via wireless communication. In the inter-vehicular communication, vehicle information is periodically transmitted/received to and from each of a plurality of vehicles in an area in which communication may be performed. The vehicle information includes information of a vehicle ID uniquely assigned to each vehicle, an absolute position of the vehicle detected by the GPS of the vehicle, the speed of the vehicle, a travel direction of the vehicle, a type and height of the vehicle and the like. The inter-vehicular communication device 30 transmits the vehicle information of another vehicle received via the inter-vehicular communication to the driving assistance ECU 11. According to this, the vehicle information of another vehicle is input to the driving assistance ECU 11 and the driving assistance ECU 11 can grasp the travel states of another vehicle located around the vehicle 10. That is to say, the driving assistance ECU 11 can receive the vehicle information about another vehicle located around the vehicle 10 which becomes the obstacle as the detection information of the obstacle.

The infrastructure communication device 31 is the communication device which communicates with the infrastructure device provided at the intersection, on the road and the like by an optical signal such as an infrared signal. The infrastructure communication device 31 receives an infrastructure information signal transmitted from the infrastructure device and transmits the received infrastructure information signal to the driving assistance ECU 11. According to this, the driving assistance ECU 11 can grasp infrastructure information. For example, the infrastructure communication device 31 receives road traffic information distributed from a VICS (™) center as a piece of the infrastructure information through the infrastructure device. The road traffic information includes congestion information such as a congestion section and a congestion degree, traffic regulation information such as road closure and the like, for example. Further, the infrastructure information also includes accompanying information accompanying with the road such as a road situation (including an intersection shape, a curvature, a gradient, and the number of lanes) of the road around the infrastructure device and moving object information indicating a position and a speed of a moving object such as another vehicle and a pedestrian around detected by ground installation and the like. According to this, the driving assistance ECU 11 can receive the moving object information about another vehicle, the pedestrian and the like around the vehicle 10 which becomes the obstacle as the detection information of the obstacle.

In addition, the infrastructure information also includes service information indicating a type of currently performed providing service. The providing service being various assistance services provided by using the road traffic information distributed from the VICS (™) center and includes the service to provide the congestion information, required time, traffic hazard information, traffic regulation information, parking information and the like and detection service (driving assistance service) which uses the detection information of the obstacle and the like, for example. In the embodiment, the service information is used when the driving assistance ECU 11 determines whether the currently performed providing service is the detection service to use the detection information.

The GPS 32 receives a GPS satellite signal for detecting the absolute position of the vehicle 10 and detects the position of the vehicle 10 based on the received GPS satellite signal. The GPS 32 transmits information of the detected position of the vehicle 10 to the driving assistance ECU 11. According to this, the driving assistance ECU 11 can grasp the position of the vehicle 10.

The in-vehicle camera 33 takes an image of a predetermined area in front of the vehicle 10 by an optical CCD camera installed on a rear side of a room mirror and transmits an image signal based on the taken image to the driving assistance ECU 11. The driving assistance ECU 11 extracts a state of the traffic light (color and the like of the traffic light) in front of the same, states of a leading vehicle and the oncoming vehicle in front of the same based on the signal of the image taken by the in-vehicle camera 33. Further, the driving assistance ECU 11 can determine whether it is in a situation in which the vehicle 10 can turn right safely by providing the driving assistance based on the state of the traffic light in front of the same and the oncoming vehicle and the like in front of the same which are extracted. The driving assistance ECU 11 can obtain information extracted based on the image signal about the leading vehicle, the oncoming vehicle and the like in front of the vehicle 10 which become the obstacles as the detection information of the obstacles.

The in-vehicle radar 34 emits laser light to a predetermined area in front of the vehicle to detect a distance to a reflecting object such as the vehicle and the like in front of the same reflecting the laser light, a relative speed thereof, an orientation thereof and the like. The detection results are transmitted to the driving assistance ECU 11 for each reflecting object. According to this, the driving assistance ECU 11 can obtain the detection information of the obstacle including the moving object such as another vehicle and the pedestrian in front of the vehicle 10 and can determine whether there is the obstacle and identify a type thereof or grasp a distance thereto based on the detection information.

Further, the various sensors such as the vehicle speed sensor 40, the acceleration sensor 41, the gyro sensor 42, the brake sensor 43, the accelerator sensor 44, and the steering angle sensor 45 are electrically connected to the driving assistance ECU 11.

The vehicle speed sensor 40 transmits a signal according to a detected rotational speed of a wheel to the driving assistance ECU 11. The acceleration sensor 41 transmits a signal according to detected acceleration of the vehicle to the driving assistance ECU 11. The gyro sensor 42 transmits a signal according to a detected travel direction of the vehicle to the driving assistance ECU 11. The brake sensor 43 transmits a signal according to presence of operation of a brake pedal by the driver and a step amount of the brake pedal which are detected to the driving assistance ECU 11. The accelerator sensor 44 transmits a signal according to presence of operation of an accelerator pedal by the driver and a step amount of the pedal which are detected to the driving assistance ECU 11. The steering angle sensor 45 transmits a signal according to a detected change amount of a steering angle of the steering to the driving assistance ECU 11 and the driving assistance ECU 11 calculates the steering angle based on the received signal.

The various signals from the above-described sensors are transmitted to the driving assistance ECU 11 with a predetermined period, so that the driving assistance ECU 11 can sequentially grasp a vehicle status such as the position, the speed, the direction and the like of the vehicle 10 based on the above-described transmitted various signals.

Various operation switches 46 such as a vehicle speed/vehicle interval control (ACC: adaptive cruise control) switch and a crash avoidance/relaxation control (PCS: pre-crash safety) switch are electrically connected to the driving assistance ECU 11.

Figure 2:
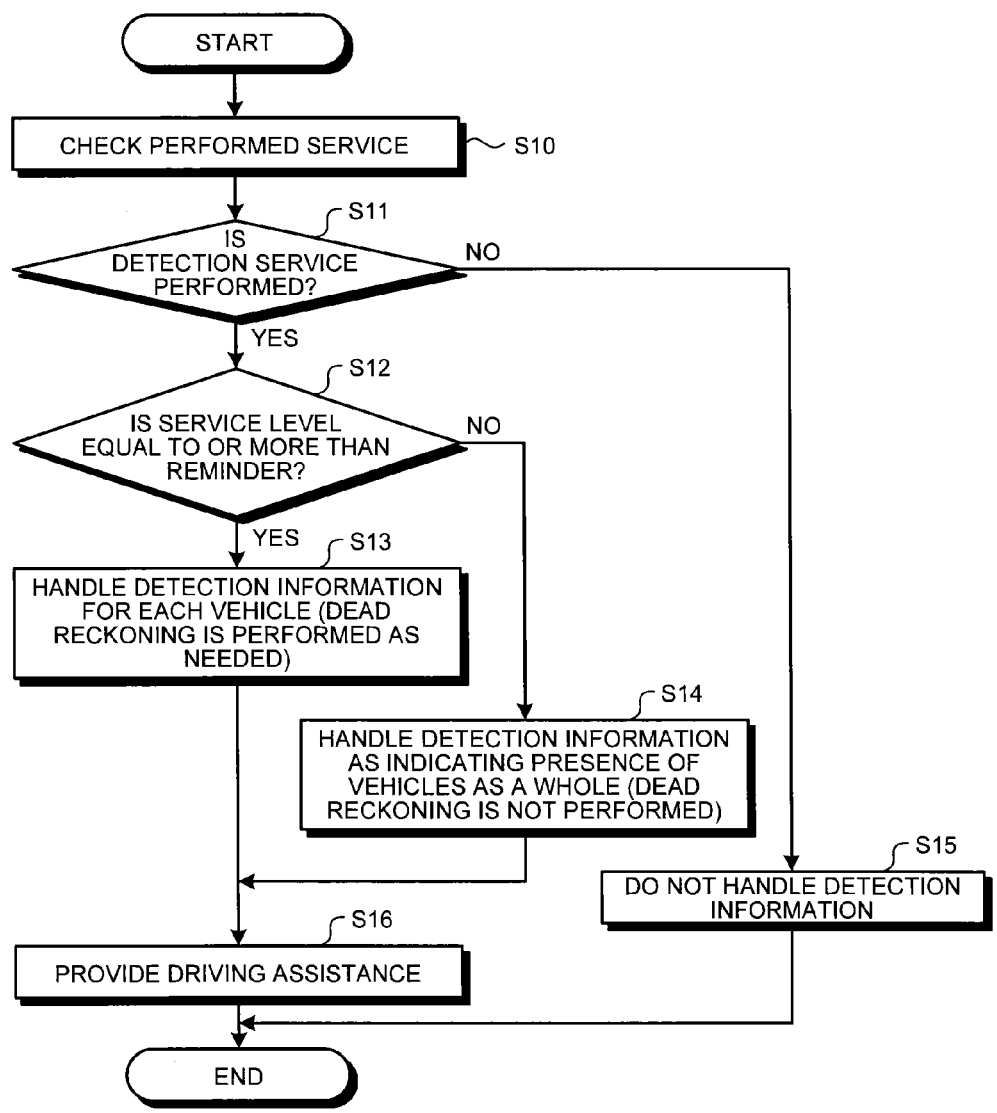
FIG. 2 is a flowchart of an outline of a driving assistance process in the embodiment.
Figure 3:
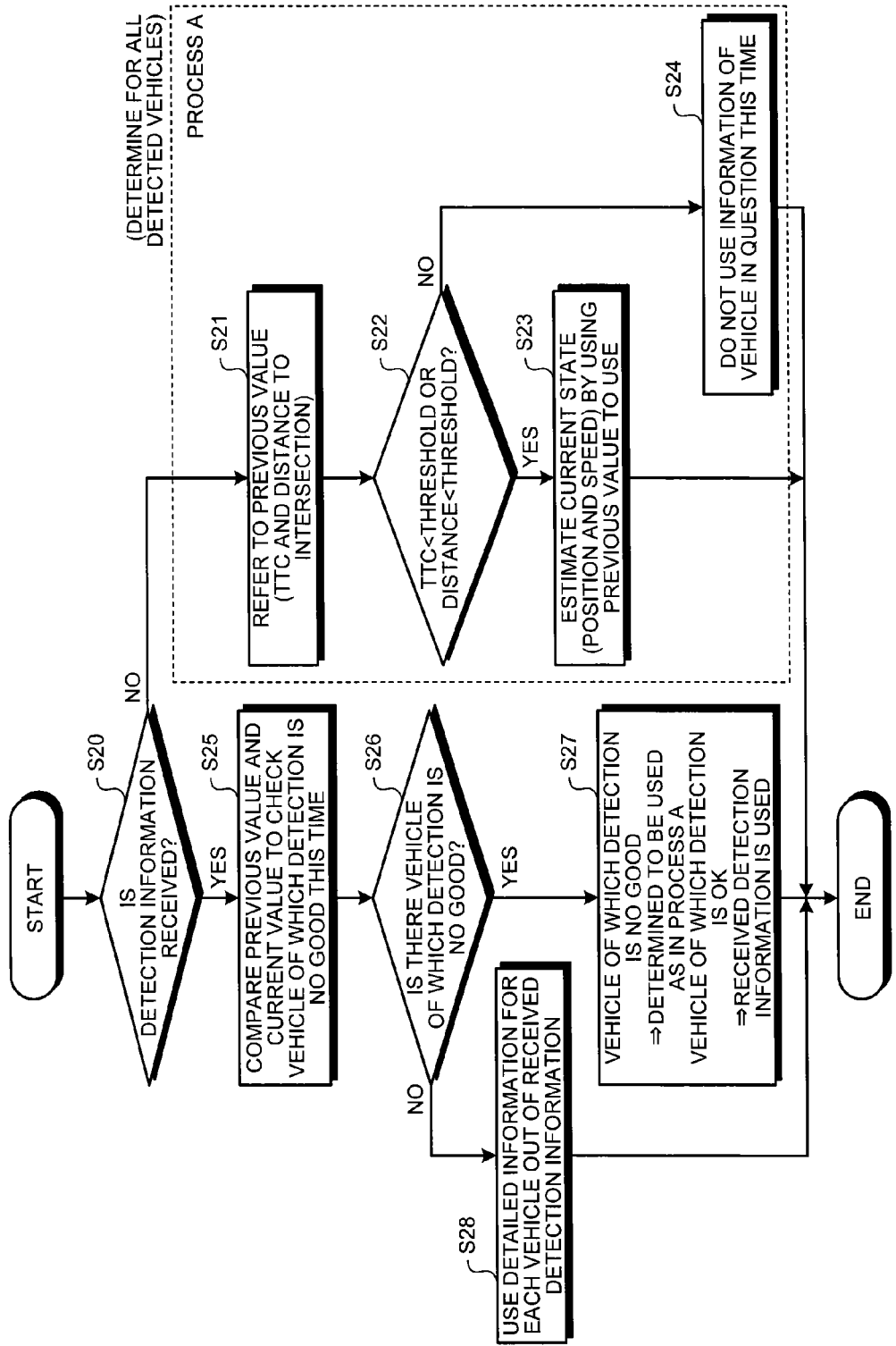
FIG. 3 is a flowchart of a part of the driving assistance process in the embodiment in detail.
Figure 4:
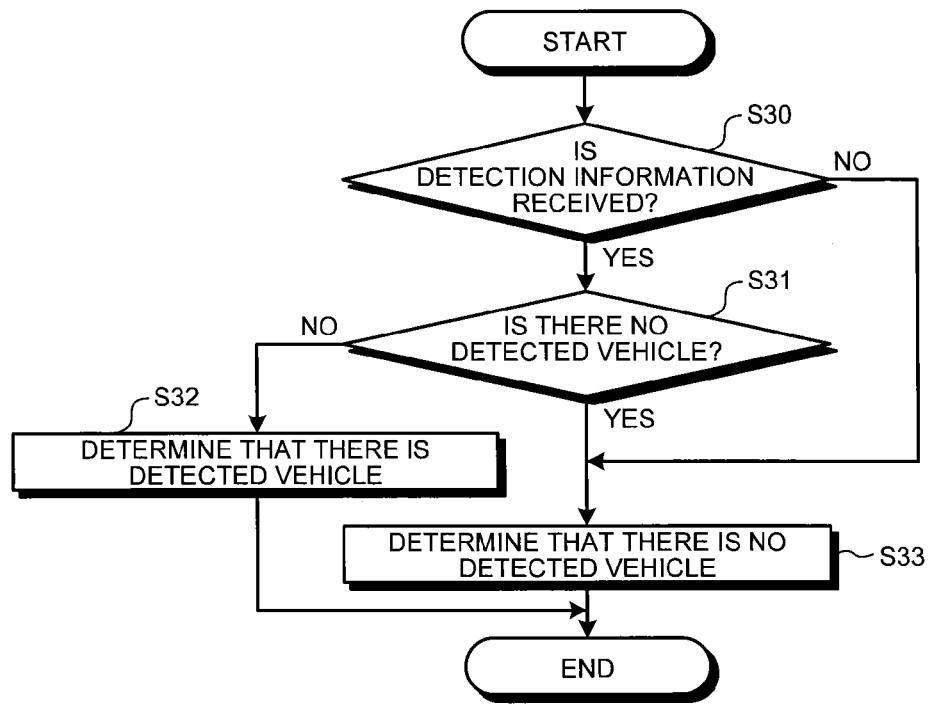
FIG. 4 is a flowchart of a part of the driving assistance process in the embodiment in detail.

Subsequently, a driving assistance process in the embodiment performed by the driving assistance ECU 11 configured in the above-described manner is described in order from FIG. 2 to FIG. 4 with reference to FIGS. 2 to 4. FIG. 2 is a flowchart of an outline of the driving assistance process in the embodiment. FIGS. 3 and 4 are flowcharts of the driving assistance process in the embodiment in detail. They are the flowcharts of a part of the driving assistance process in the first embodiment in detail.

First, the outline of this driving assistance process is described with reference to FIG. 2. As illustrated in FIG. 2, the driving assistance ECU 11 checks the currently performed (managed) providing service (step S10). For example, the driving assistance ECU 11 checks the type of the currently performed providing service based on the service information included in the infrastructure information about the intersection to which the vehicle 10 travels.

Then, the driving assistance ECU 11 determines whether the detection service is performed based on a check result obtained at step S10 (step S11). That is to say, the driving assistance ECU 11 determines whether the detection service (driving assistance service) which uses the detection information is included in the performed providing service.

When the driving assistance ECU 11 determines that the detection service is performed at step S11 (Yes at step S11), this determines whether a service level (level of the driving assistance) is equal to or more than the reminder (step S12). That is to say, the driving assistance ECU 11 refers to the setting information about the level of the driving assistance stored in the database 21 in advance to determine whether the level of the driving assistance is equal to or more than the second level to provide a reminder at step S12. On the other hand, when the driving assistance ECU 11 determines that the detection service is not performed at step S11 (No at step S11), this sets not to handle the detection information (step S15). That is to say, the driving assistance ECU 11 sets not to analyze the detection information when the detection service is not performed at step S15. Thereafter, this process is finished.

When the driving assistance ECU 11 determines that the service level is equal to or more than the reminder (that is to say, the level of driving assistance is equal to or more than the second level) at step S12 (Yes at step S12), this sets to handle the detection information for each vehicle and perform so-called dead reckoning as needed (step S13). A content of the process at step S13 is described later in detail with reference to FIG. 3.

In the embodiment, the dead reckoning includes a process to estimate a relative self-position by processing data obtained from the in-vehicle camera/radar and the various sensors of the vehicle 10, and a process to estimate the detection information of a target obstacle based on information obtained until immediately before occurrence of communication failure, when the detection information of the obstacle such as another vehicle cannot be obtained from the inter-vehicular communication device 30, the infrastructure communication device 31 and the like due to the communication failure. That is to say, in the embodiment, the dead reckoning includes the process to estimate the detection information of the obstacle which cannot be obtained and the position of the obstacle which cannot be obtained is at least estimated by the process to estimate.

Thereafter, the driving assistance ECU 11 shifts to step S16 and provides the driving assistance according to the set level of the driving assistance according to the setting to perform the dead reckoning as needed. In this case, at step S16, the driving assistance ECU 11 provides the driving assistance corresponding to the second level to provide a reminder of the obstacle or the third level to give an alarm as the driving assistance. As an example, the driving assistance ECU 11 provides the driving assistance to calculate the speed of the oncoming vehicle and the distance thereto when there is the oncoming vehicle approaching the own vehicle and provide a reminder that the oncoming vehicle is approaching, as the driving assistance at the second level. Alternatively, the driving assistance ECU 11 provides the driving assistance to calculate the time to the collision from the speed of the oncoming vehicle and the distance thereto when there is the oncoming vehicle approaching the own vehicle and give an alarm to indicate how many seconds it takes until the oncoming vehicle might collide and indicate how the vehicle 10 should be controlled so as to avoid the collision, as the driving assistance at the third level. Thereafter, this process is finished.

On the other hand, when the driving assistance ECU 11 determines that the service level is lower than the reminder (that is to say, the level of the driving assistance is lower than the second level) at step S12 (No at step S12), this sets to handle the detection information as the information indicating the presence of the vehicles as a whole and to perform the process so as not to perform the dead reckoning (step S14). A content of the process at step S14 is described later in detail with reference to FIG. 4.

Thereafter, the driving assistance ECU 11 shifts to step S16 and provides the driving assistance according to the set level of the driving assistance according to the setting not to perform the dead reckoning. In this case, at step S16, the driving assistance ECU 11 provides the driving assistance corresponding to the first level to provide the information of the detected obstacle as the driving assistance. As an example, the driving assistance ECU 11 provides the driving assistance to provide the simple information such as to detect the presence of the obstacle around the vehicle 10 and notify the driver of the presence of the obstacle, for example, as the driving assistance corresponding to the first level. Thereafter, this process is finished.

Herein, the process at step S13 in FIG. 2 described above is described in detail with reference to FIG. 3. FIG. 3 is the flowchart of a part of the driving assistance process in the embodiment in detail.

As illustrated in FIG. 3, when the driving assistance ECU 11 determines that the service level is equal to or more than the reminder (that is to say, the level of the driving assistance is equal to or more than the second level) at step S12 in FIG.

2 described above (Yes at step S12), this shifts to a process at step S20 and determines whether the detection information of the obstacle such as another vehicle is received from the inter-vehicular communication device 30, the infrastructure communication device 31 and the like. That is to say, the driving assistance ECU 11 checks whether the detection information is newly received this time at step S20.

When the driving assistance ECU 11 determines that the detection information is not received at step S20 (No at step S20), this executes processes at following steps S21 to S24 on all of the detected vehicles. In the embodiment, the processes at steps S21 to S24 is referred to as a "process A". The process A is hereinafter described in detail.

Specifically, the driving assistance ECU 11 refers to a previous value (for example, information indicating TTC (time-to-collision), a distance to the intersection and the like) based on past detection information stored in the database 21 (step S21) to determine whether the TTC is shorter than a threshold (TTC<threshold) or the distance to the intersection is shorter than a threshold (distance<threshold) (step S22). That is to say, when the driving assistance ECU 11 cannot receive the detection information, this refers to the previous value of each vehicle to check whether this is equal to or shorter than the threshold at step S22.

When the driving assistance ECU 11 determines that the TTC is shorter than the threshold (TTC<threshold) or the distance to the intersection is shorter than the threshold (distance<threshold) at step S22 (Yes at step S22), this sets to estimate a current state (position, speed and the like) by using the previous value and use the estimated value in the driving assistance (step S23). That is to say, when the TTC or the distance to the intersection is shorter than the threshold, the driving assistance ECU 11 performs the dead reckoning to estimate the current position and speed from the previous (or before then) position and speed of a detection target and outputs the values at step S23. Thereafter, this shifts to the process at step S16 in FIG. 2 described above.

On the other hand, when the driving assistance ECU 11 determines that the TTC is equal to or longer than the threshold (TTC threshold) or the distance to the intersection is equal to or longer than the threshold (distance≥threshold) at step S22 (No at step S22), this sets not to use the information of the vehicle in question in the driving assistance this time (step S24). That is to say, when the TTC or the distance to the intersection is equal to or longer than the threshold, the driving assistance ECU 11 does not output for the target in question (that is to say, handles the same as if this does not exist) at step S24.

Herein, the process A (processes at steps S21 to S24) is hereinafter described. When the detection information cannot be received (reception is no good) or when the target obstacle cannot be detected (detection is no good), performing the dead reckoning for all the targets the detection information of which cannot be obtained puts a too heavy processing load. Further, the target away from the intersection to a certain degree has time to arrive at the intersection, so that possibility to provide the driving assistance for the detection target is considered to be extremely low even when detailed information about the detection target is obtained. In this case, it is considered that absence of the detection information itself substantially does not matter. Therefore, in the embodiment, the process A is performed considering that it is sufficient to perform the dead reckoning only for the target of which collision possibility increases immediately by checking this from the previous speed and distance to the intersection out of the targets the detection information of which cannot be obtained.

Herein, returning to the process at step S20, when the driving assistance ECU 11 determines that the detection information is received at step S20 (Yes at step S20), this compares the previous value and the current value of the received detection information and checks the vehicle the detection of which is no good this time (step S25). That is to say, when the driving assistance ECU 11 receives the detection information, this compares the previous detection information with the current one to check whether there is no detection mistake at step S25. For example, the driving assistance ECU 11 determines whether the detection information with the same ID as that of the detection target included in the previous detection information is not included in the current detection information, thereby checking whether there is no detection mistake.

When the driving assistance ECU 11 determines that there is the vehicle the detection of which is no good at step S26 (Yes at step S26), this sets to perform the dead reckoning to estimate the current position and speed based on the previous value as in the case of the above-described process A about the vehicle which cannot be detected (vehicle the detection of which is no good) to output the value, and to directly use the received detection information in the driving assistance about the detected vehicle (vehicle the detection of which is OK) (step S27). Thereafter, this shifts to the process at step S16 in FIG. 2 described above.

On the other hand, when the driving assistance ECU 11 determines that there is no vehicle the detection of which is no good at step S26 (No at step S26), that is to say, when there is no vehicle which cannot be detected, this sets to use the detailed information for each vehicle from the received detection information in the driving assistance (step S28). That is to say, the driving assistance ECU 11 sets to directly use the received detection information in the driving assistance at step 528. Thereafter, this shifts to the process at step S16 in FIG. 2 described above.

Next, the process at step S14 in FIG. 2 described above is described in detail with reference to FIG. 4. FIG. 4 is the flowchart of a part of the driving assistance process in the embodiment in detail.

As illustrated in FIG. 4, when the driving assistance ECU 11 determines that the service level is lower than the reminder (that is to say, the level of the driving assistance is lower than the second level) at step S14 in FIG. 2 described above (No at step S12), this shifts to a process at step S30 to determine whether the detection information of the obstacle such as another vehicle is received from the inter-vehicular communication device 30, the infrastructure communication device 31 and the like. That is to say, the driving assistance ECU 11 checks whether the detection information is newly received this time at step S30.

When the driving assistance ECU 11 determines that the detection information is received at step S30 (Yes at step S30), this checks whether there is no detected vehicle (step S31). That is to say, when the driving assistance ECU 11 can receive the detection information, this checks whether the received detection information indicates that there is any detected vehicle at step S31. On the other hand, when the driving assistance ECU 11 determines that the detection information is not received at step S30 (No at step S30), this shifts to a process at step S33 to determine that "there is no detected vehicle" and thereafter shifts to the process at step S16 in FIG. 2 described above.

When the driving assistance ECU 11 checks that there is the detected vehicle at step S31 (No at step S31), that is to say, when there is at least one detected vehicle, this determines that "there is the detected vehicle" (step S32), and thereafter shifts to the process at step S16 in FIG. 2 described above.

On the other hand, when the driving assistance ECU 11 checks that there is no detected vehicle at step S31 (Yes at step S31), that is to say, when there is no detected vehicle at all, or when the detected information cannot be received, this determines that "there is no detected vehicle" (step S33) and thereafter shifts to the process at step S16 in FIG. 2 described above.

The processes at steps S30 to S33 in FIG. 4 are hereinafter described. When the service level is lower than the reminder, collision determination using the TTC is not performed and information simply indicating whether there is another vehicle around the vehicle 10 is only required, so that it is considered to be not necessary to analyze detailed information included in the detection information. Similarly, when an area in which another vehicle around the vehicle 10 is present is indicated, information indicating whether another vehicle is present in front of or at the back of a detection area of the vehicle 10 is only required, so that it is considered to be not necessary to analyze the detailed information included in the detection information. In consideration of this, in the processes at steps S30 to S33 in FIG. 4, when the detection information cannot be received or when the target vehicle cannot be detected, it is determined that "there is no detected vehicle" and the process to estimate the presence of another vehicle from the previous value and the like (dead reckoning) as illustrated in FIG. 3 described above is not performed. This is because HMI display generally used in the driving assistance is configured to continue the HMI display for some seconds after the presence of the target vehicle disappears.

[First Variation]

Figure 5:
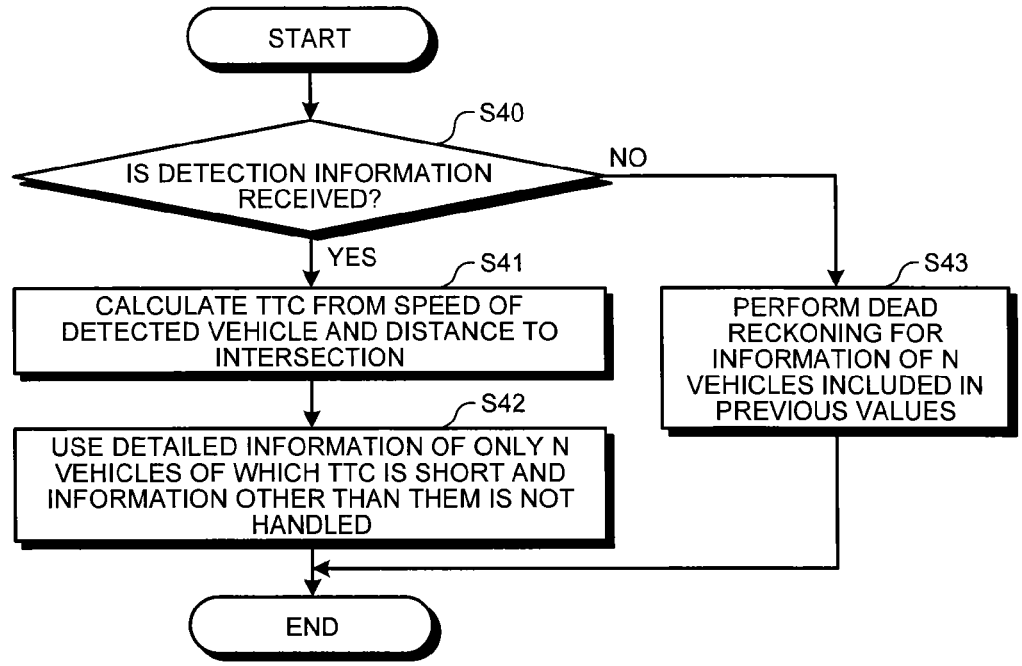
FIG. 5 is a flowchart of a part of a driving assistance process in the first variation of the embodiment in detail.

The first variation of a detail of a process at step S13 in FIG. 2 described above is described with reference to FIG. 5. FIG. 5 is a flowchart of a part of a driving assistance process in the first variation of the embodiment in detail.

As illustrated in FIG. 5, when a driving assistance ECU 11 determines that a service level is equal to or more than a reminder (that is to say, a level of driving assistance is equal to or more than a second level) at step S12 in FIG. 2 described above (Yes at step S12), this shifts to a process at step S40 to determine whether detection information of an obstacle such as another vehicle is received from an inter-vehicular communication device 30, an infrastructure communication device 31 and the like. That is to say, the driving assistance ECU 11 checks whether the detection information is newly received this time at step S40.

When the driving assistance ECU 11 determines that the detection information is received at step S40 (Yes at step S40), this calculates TTC indicating collision possibility from a speed of a detected vehicle and a distance between the same and an intersection (step S41). The driving assistance ECU 11 sets to use detailed information of the detection information only of N vehicles the TTC of which is short in the driving assistance and not to handle information other than them (step S42). That is to say, the driving assistance ECU 11 sets to compare the TTCs of all targets and analyze the detailed information of the detection information only of top N vehicles the value of which is small (that is to say, the collision possibility is high) such that this may be used in a driving assistance application at step S42. Thereafter, this shifts to a process at step S16 in FIG. 2 described above.

On the other hand, when the driving assistance ECU 11 determines that the detection information is not received at step S40 (No at step S40), this performs dead reckoning for the information of the N vehicles included in previous values to output values (step S43). That is to say, when the driving assistance ECU 11 cannot receive the detection information, this sets to perform the dead reckoning for the previous top N vehicles such that the values may be used in the driving assistance application at step S43. Thereafter, this shifts to the process at step S16 in FIG. 2 described above.

The first variation is hereinafter described. In a process illustrated in FIG. 3 described above, all pieces of information are analyzed when the detection information is received, and a current value is estimated only for a target which may be necessary when the detection information is not received or the vehicle is not detected. On the other hand, the process described in the first variation is simpler than the process illustrated in FIG. 3 described above, in that a required detection target is narrowed in advance when the detection information can be received and the current value may be estimated based on an already narrowed previous value when the detection information is not received or the vehicle is not detected, and in that it is not determined whether there is the vehicle which is not detected when the detection information is received, in the first variation.

[Second Variation]

Figure 6:
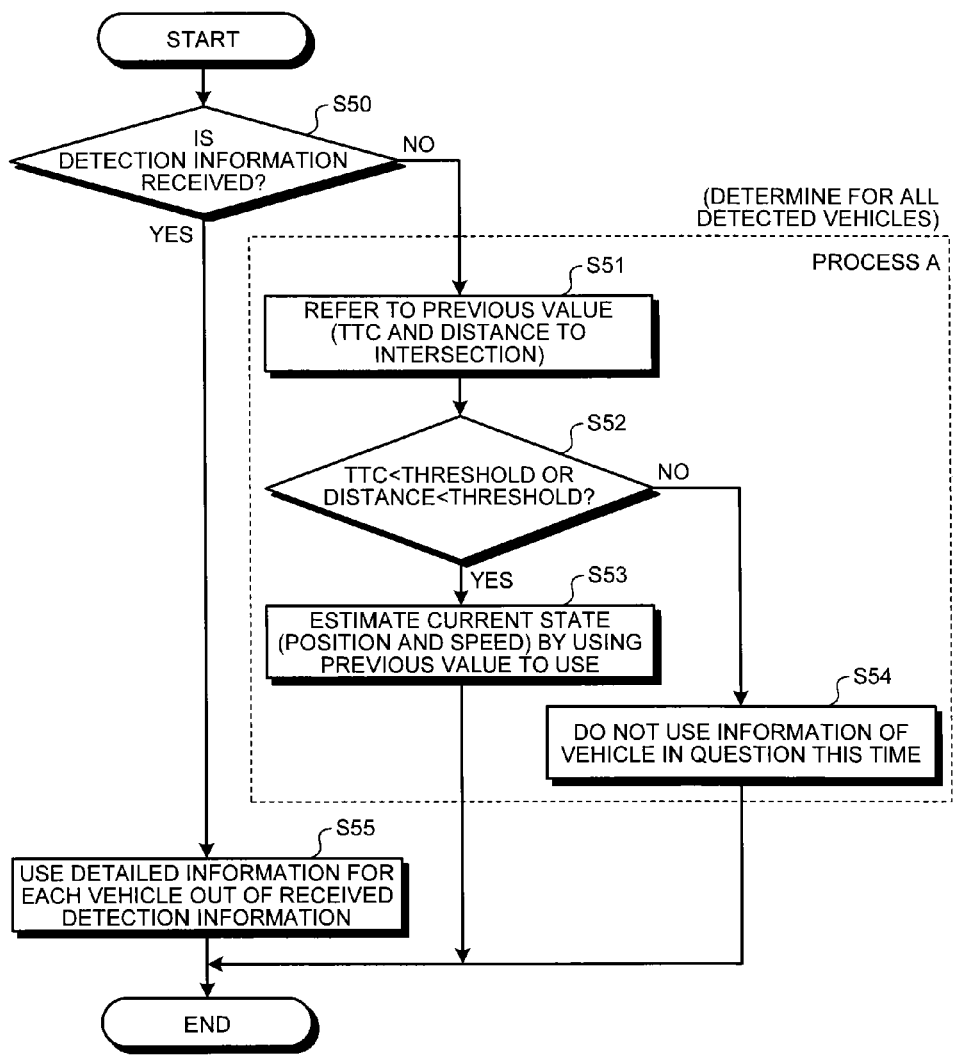
FIG. 6 is a flowchart of a part of a driving assistance process in the second variation of the embodiment in detail.

The second variation of a detail of a process at step S13 in FIG. 2 described above is described with reference to FIG. 6. FIG. 6 is a flowchart of a part of a driving assistance process in a second variation of the embodiment in detail.

As illustrated in FIG. 6, when a driving assistance ECU 11 determines that a service level is equal to or more than a reminder (that is to say, a level of driving assistance is equal to or more than a second level) at step S12 in FIG. 2 described above (Yes at step S12), this shifts to a process at step S50 and determines whether detection information of an obstacle such as another vehicle is received from an inter-vehicular communication device 30, an infrastructure communication device 31 and the like. That is to say, the driving assistance ECU 11 checks whether the detection information is newly received this time at step S50.

When the driving assistance ECU 11 determines that the detection information is not received at step S50 (No at step S50), this executes processes at following steps S51 to S54 on all of detected vehicles. Meanwhile, the processes at steps S51 to S54 are similar to the processes at steps S21 to S24 in FIG. 3 described above, so that the description thereof is omitted. Thereafter, this shifts to a process at step S16 in FIG. 2 described above.

On the other hand, when the driving assistance ECU 11 determines that the detection information is received at step S50 (Yes at step S50), this sets to use detailed information for each vehicle out of the received detection information in the driving assistance (step S55). That is to say, when the driving assistance ECU 11 can receive the detection information, this sets to analyze the detailed information of each target based on the received detection information such that this may be used in a driving assistance application at step S55.

The second variation is hereinafter described. In the second variation, dead reckoning is performed for the target which might collide only when the detection information is not received, and if only a part of the target is not detected, this is not dealt with, that is to say, it is determined that the vehicle which is not detected is not present. This is because it is considered to be highly possible that the vehicle which is not detected cannot be detected because this travels immediately after the vehicle with higher collision possibility and cannot be detected or this is located on a far side of a detection area (that is to say, on a side away from an intersection) and is hardly detected, for example. In this case, the driving assistance may be provided not for the vehicle which is not detected but for the detected vehicle, so that it can also be considered that necessity of the dead reckoning for the vehicle which is not detected is low, so that the second variation is effective.

As described above, according to the embodiment, it is possible to change a level of detail of the information to be handled according to the level of the driving assistance when the detection information of the obstacle distributed from the infrastructure device and the like is used in the driving assistance. Therefore, it becomes possible to analyze the information used in the driving assistance after determining a range to be analyzed thereof according to the level of the driving assistance. According to the embodiment, it is possible to determine whether to estimate the vehicle position when the detection information of the obstacle cannot be received or when a part of the vehicles cannot be detected according to the level of the driving assistance. Therefore, it becomes possible to determine whether to perform the dead reckoning of the target according to the driving assistance level, determine whether current collision possibility is relatively high compared to the previous value and the like to determine whether to perform the dead reckoning of the target according to the possibility, or determine based on both of them to analyze the data. As a result, according to the embodiment, it is possible to suppress an information processing load in the driving assistance.

In addition, in the embodiment, the driving assistance ECU 11 may determine whether the detection information corresponding to the detection information which cannot be obtained is included in the infrastructure information received from the infrastructure device capable of communicating if the detection information cannot be obtained via the inter-vehicular communication when the level of the driving assistance is equal to or more than the threshold (that is to say, equal to or more than the reminder). The driving assistance ECU 11 may use the detection information included in the infrastructure information in the driving assistance in place of the detection information which cannot be obtained when the corresponding detection information is included in the infrastructure information. According to this, it becomes possible to provide the driving assistance without performing the dead reckoning as far as possible, so that it is possible to eventually further reduce the information processing amount of the driving assistance.

REFERENCE SIGNS LIST

10 Vehicle
11 Driving assistance ECU (driving assistance device)
12 Brake ECU
13 Engine ECU
14 Steering ECU
20 Car navigation system
21 Database
25 Speaker
30 Inter-vehicular communication device
31 Infrastructure communication device
32 GPS
33 In-vehicle camera
34 In-vehicle radar
40 Vehicle speed sensor
41 Acceleration sensor
42 Gyro sensor
43 Brake sensor
44 Accelerator sensor
45 Steering angle sensor
46 ACC switch/PCS switch

The invention claimed is:

1. A driving assistance device configured to provide driving assistance based on detection information of an obstacle, wherein
    the driving assistance device changes an information processing amount of the driving assistance for the obstacle by determining whether to perform a process to estimate the detection information of the obstacle which cannot be obtained according to a level of the driving assistance.

2. The driving assistance device according to claim 1, wherein
    the driving assistance device decreases the information processing amount of the driving assistance according to a decrease in the level of the driving assistance.

3. The driving assistance device according to claim 2, wherein
    the driving assistance device decreases the information processing amount of the driving assistance by not performing dead reckoning to at least estimate a position of the obstacle which cannot be obtained at the time the level of the driving assistance is lower than a threshold and by performing the dead reckoning at the time the level of the driving assistance is equal to or more than the threshold.

4. The driving assistance device according to claim 2, comprising:
    a level determining unit mounted on a vehicle, wherein
    the level of the driving assistance is the level determined by the level determining unit.

5. The driving assistance device according to claim 2, wherein
    the level of the driving assistance is a warning level about the obstacle.

6. The driving assistance device according to claim 3, wherein
    at the time the level of the driving assistance is equal to or more than the threshold and at the time the detection information cannot be obtained, the driving assistance device decreases the information processing amount of the driving assistance by not performing the dead reckoning at the time possibility of collision with the obstacle is low and by performing the dead reckoning at the time the possibility of collision with the obstacle is high.

7. The driving assistance device according to claim 3, comprising:
    a level determining unit mounted on a vehicle, wherein
    the level of the driving assistance is the level determined by the level determining unit.

8. The driving assistance device according to claim 3, wherein
    the level of the driving assistance is a warning level about the obstacle.

9. The driving assistance device according to claim 6, wherein
    at the time the level of the driving assistance is equal to or more than the threshold and at the time the detection information cannot be obtained, the driving assistance device determines whether the detection information corresponding to the detection information which cannot be obtained is included in infrastructure information received from an infrastructure device capable of communicating, and
    at the time the corresponding detection information is included in the infrastructure information, the driving assistance device decreases the information processing amount of the driving assistance by not performing the dead reckoning.

10. The driving assistance device according to claim 6, wherein
the level of the driving assistance is a warning level about the obstacle,
the warning level about the obstacle includes information provision, a reminder with the warning level higher than the warning level of the information provision, and an alarm with the warning level higher than the warning level of the reminder,
the driving assistance device does not perform the dead reckoning at the time the warning level about the obstacle is the information provision, and perform the dead reckoning at the time the warning level about the obstacle is the reminder or the alarm.

11. The driving assistance device according to claim 6, comprising:
a level determining unit mounted on a vehicle, wherein
the level of the driving assistance is the level determined by the level determining unit.

12. The driving assistance device according to claim 6, wherein
the level of the driving assistance is a warning level about the obstacle.

13. The driving assistance device according to claim 9, comprising:
a level determining unit mounted on a vehicle, wherein
the level of the driving assistance is the level determined by the level determining unit.

14. The driving assistance device according to claim 9, wherein
the level of the driving assistance is a warning level about the obstacle.

15. The driving assistance device according to claim 1, comprising:
a level determining unit mounted on a vehicle, wherein
the level of the driving assistance is the level determined by the level determining unit.

16. The driving assistance device according to claim 15, wherein
the level of the driving assistance is a warning level about the obstacle.

17. The driving assistance device according to claim 1, wherein
the level of the driving assistance is a warning level about the obstacle.

18. The driving assistance device according to claim 17, wherein
the warning level about the obstacle includes information provision, a reminder with the warning level higher than the warning level of the information provision, and an alarm with the warning level higher than the warning level of the reminder.

19. The driving assistance device according to claim 1, wherein
the information processing amount of the driving assistance is an amount of processing the detection information of the obstacle.

20. A driving assistance device configured to provide driving assistance to output information which is recognizable to a driver based on detection information of an obstacle, wherein
the driving assistance device increases an information amount of the driving assistance which is recognizable to the driver according to an increase in a level of the driving assistance.

* * * * *